(12) United States Patent
Goodwin

(10) Patent No.: US 10,383,411 B2
(45) Date of Patent: Aug. 20, 2019

(54) VENTED RING AND METHOD

(71) Applicant: Peter Mark Goodwin, Port Alsworth, AK (US)

(72) Inventor: Peter Mark Goodwin, Port Alsworth, AK (US)

(73) Assignee: Groove Life Corporation, Spring Hill, TN (US)

( * ) Notice: Subject to any disclaimer, the term of this patent is extended or adjusted under 35 U.S.C. 154(b) by 334 days.

(21) Appl. No.: 15/229,493

(22) Filed: Aug. 5, 2016

(65) Prior Publication Data

US 2018/0035768 A1 Feb. 8, 2018
US 2018/0271233 A9 Sep. 27, 2018

Related U.S. Application Data

(60) Provisional application No. 62/246,925, filed on Oct. 27, 2015.

(51) Int. Cl.
| | |
|---|---|
| *A44C 9/00* | (2006.01) |
| *B29C 45/14* | (2006.01) |
| *B29C 45/26* | (2006.01) |
| *B29K 21/00* | (2006.01) |
| *B29L 31/00* | (2006.01) |

(52) U.S. Cl.
CPC .............. *A44C 9/0007* (2013.01); *A44C 9/00* (2013.01); *B29C 45/14336* (2013.01); *B29C 45/263* (2013.01); *B29K 2021/00* (2013.01); *B29L 2031/743* (2013.01)

(58) Field of Classification Search
CPC ....... A44C 9/00; A44C 9/0007; A44C 9/0015; A44C 9/0038; A44C 9/0053
See application file for complete search history.

(56) References Cited

U.S. PATENT DOCUMENTS

| | | | |
|---|---|---|---|
| D515,965 S | 2/2006 | D'Annunzio | |
| D516,451 S | 3/2006 | D'Annunzio | |
| D518,749 S | 4/2006 | D'Annunzio | |
| 7,350,377 B2 * | 4/2008 | Kaplan | A44C 5/0092 63/15 |
| D750,994 S | 3/2016 | Baker et al. | |
| D751,447 S | 3/2016 | Baker et al. | |
| D751,448 S | 3/2016 | Baker et al. | |
| D780,615 S | 3/2017 | Baker et al. | |
| D784,182 S | 4/2017 | Baker et al. | |
| D789,231 S | 6/2017 | Baker et al. | |
| D789,232 S | 6/2017 | Baker et al. | |
| D789,233 S | 6/2017 | Baker et al. | |
| D789,234 S | 6/2017 | Baker et al. | |

(Continued)

*Primary Examiner* — Abigail E Troy
(74) *Attorney, Agent, or Firm* — Eric B. Fugett; Mark A. Pitchford; Pitchford Fugett, PLLC

(57) ABSTRACT

A vented or decorative finger ring and its method of manufacture that employs a co-injection mold casting of the vented or decorative finger ring that is formed with joined outer and inner rings where the inner ring includes a plurality of interconnected lateral and longitudinal slots or grooves, where the lateral slots or grooves are space apart and extend from the inner ring edges that each connect to a series of linked longitudinal slots or grooves formed around the inner ring that extend to the inner surface of the outer ring, forming air flow paths across the inner ring, between the inner ring edges.

12 Claims, 6 Drawing Sheets

(56) References Cited

U.S. PATENT DOCUMENTS 9,943,146 B2 4/2018 Baker et al.
2014/0083135 A1* 3/2014 Martinez .............. A44C 9/0092
63/15.8

* cited by examiner

VENTED RING AND METHOD

BACKGROUND OF THE INVENTION

This application was filed as a Provisional Application No. 62246925, for a "GROOVE RING", filed Oct. 27, 2015, that priority of the present application is hereby claimed for.

FIELD OF THE INVENTION

A vented or decorative ring for wear by a person that includes interconnecting lateral and longitudinal slots or grooves formed across and around the ring inner surface that provide for passage of an air flow between the ring inner surface and the wearer's finger, eliminating a wrinkling, bleaching and/or peeling, sometimes call "pickling" of the skin of the wearer's finger under the ring, and method for its manufacture.

PRIOR ART

The invention meets a need to provide a vented or decorative finger ring that can be worn comfortably and provides for a free flow of air that passes between the ring wearer's finger and ring inner circumference regardless of weather conditions, eliminating finger discomfort and swelling resulting from a heat and moisture build-up under the ring, as is common. Even with wear over a long period of time, the wearer of the vented or decorative finger ring of the invention will not experience skin wrinkling, bleaching and/or pealing, sometimes called "pickling", of the ring wearer's skin under the ring. In effect, the structure of the ring of the invention provides an air flow under the ring that is the equivalent of the ring breathing.

Within the knowledge of the inventor, no ring, regardless of the material that it is made from, has provided the comfort to the wearer that the ring of the invention provides, and, with the manufacture of the vented or decorative ring of the invention from a silicone, rubber, or a like material, the decorative finger ring, if caught on something during wear, will break away from, and release, the finger, before the finger can sustain an injury.

SUMMARY OF THE INVENTION

It is a principal object of the present invention to provide a vented or decorative finger ring having inner and outer ring components that are formed together into a single unit as a finished ring, and which inner ring has a number of lateral and vertical slots or grooves molded therein that intersect to provide for a free passage of air under the finished decorative finger ring, providing an air flow across the skin of the ring wearer's finger.

Another object of the present invention is to provide an inner ring that is formed with lateral slots that intersect a pattern of vertical slots formed through the inner ring that, when the inner ring is molded into the outer ring, form intersecting slots in and around the inner ring that provide a free passage of air under the finished ring, across the skin of the ring wearer's finger.

Another object of the present invention is to provide a vented or decorative finger ring formed by co-injection molding of inner and outer rings together, where in outer ring receives the inner ring molded thereto, the inner and outer rings forming a single vented or decorative finger ring.

Still another object of the present invention is to provide a vented or decorative finger ring that is preferably formed from a silicone or rubber material that can be opaque, colored or clear for decorative appeal.

Still another object of the present invention is to provide a method for co-injection molding the inner ring to the outer ring forming the vented or decorative finger ring of the invention.

The invention is in a vented or decorative finger ring that is suitable for continuous wear even when the wearer's hand is exposed to water that flows under the ring, or to sweat from exertions by the wearer, or the like, where such entrapment of water on the skin of the wearer's finger, under the decorative finger ring can create skin wrinkling, bleaching and/or pealing, sometimes known as pickling. Which skin conditions are prohibited from occurring by the features of the vented or decorative finger ring of the invention that provides for a circulation of air between the wearer's skin and ring inner surface.

In practice, the vented or decorative finger ring of the invention is formed by co-injection molding from the outer ring to the inner ring that are bonded together in the molding process into the vented or decorative finger ring. Preferably, the inner and outer rings are formed from silicone, rubber, or other elastomer that will break, or is not likely to catch on, or be caught by, a machine, or the like, that could damage the wearer's finger. Which material, or course, is less expensive than a metal, such as gold or silver, and therefore less expensive to manufacture. It should, however, be understood that the vented or decorative finger ring of the invention can be manufacture from metals within the scope of this disclosure.

The outer ring is preferably formed with smooth outer and inner surfaces and can be colored or have an opaque or translucent appearance, and the inner ring is formed within the outer ring in the co-molding injection process to have a plurality of lateral and longitudinal slots or grooves that interconnect such that a network of grooves is formed that are open, on both ring sides, to an air flow across the inner ring. Which lateral slots or grooves are preferably space apart from one another around the sides of the inner ring, and the longitudinal slots or grooves can be straight to encircle the inner ring and include crossing slots or groove, or the longitudinal slots or grooves can be formed into a design, such as intersecting circles, ellipses, triangles, or the like that connect to the lateral slots or grooves.

DESCRIPTION OF THE DRAWINGS

In the drawings that illustrate that which is presently regarded as the best mode for carrying out the invention.

DETAILED DESCRIPTION

Figure 1:
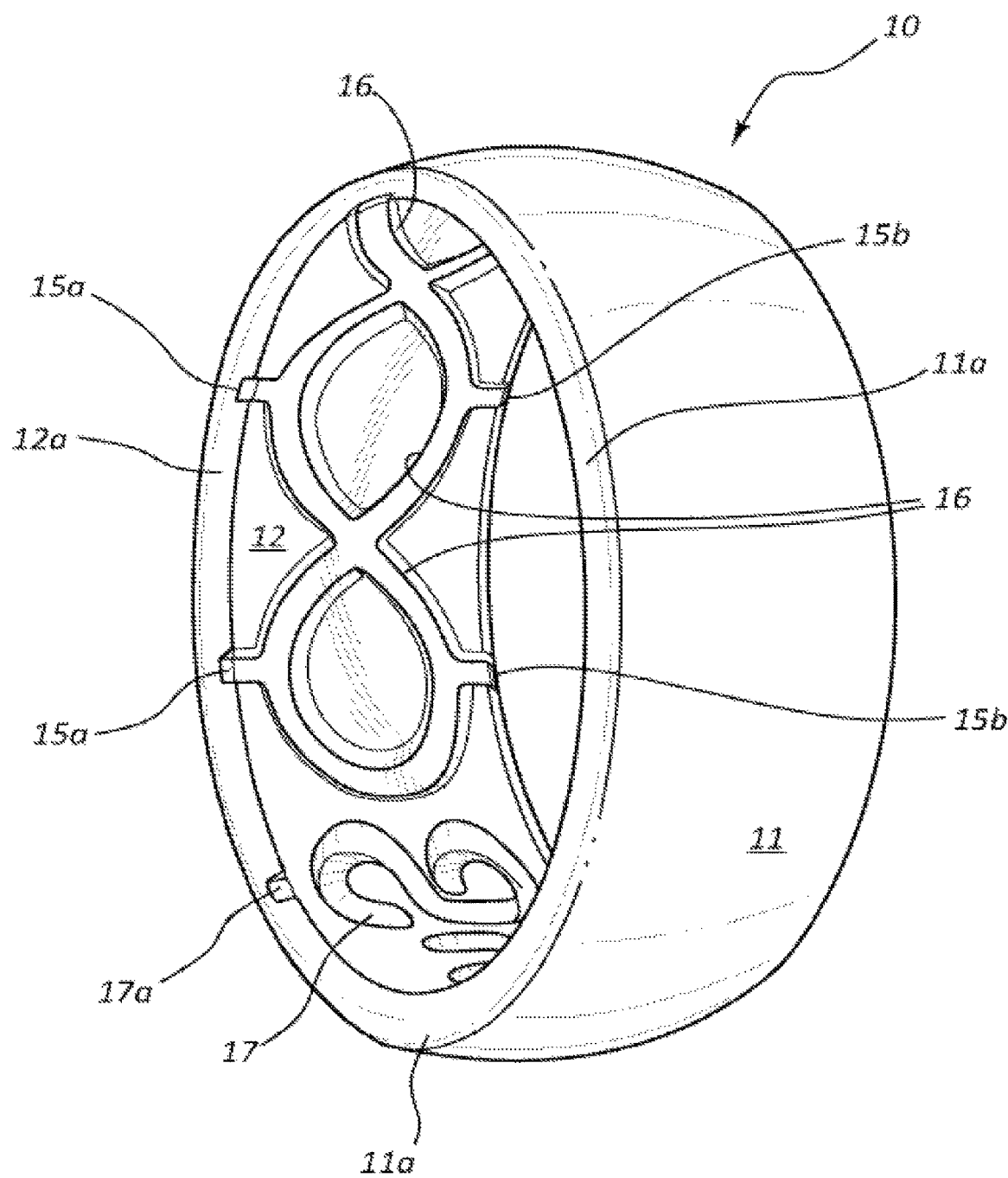
FIG. 1 is a side elevation perspective view taken from a left side of a vented or decorative finger ring of the invention showing an inner ring within an outer ring, where the inner ring has had a number of spaced lateral grooves or slots formed inwardly from the sides of which inner ring that intersect longitudinal decorative slots or grooves, and where the combination of the lateral and longitudinal grooves or slots provide passages across the inner ring, and shows the outer ring as having a smooth outer surface and beveled edges.

FIG. 1 shows a profile perspective view of a vented or decorative finger ring 10 of the invention consisting of an outer ring 11 that is fitted with an inner ring 12, and is taken from a left side 11a of the vented or decorative finger ring 10, and showing, through the inner ringer 12, the right side 11b of the vented or decorative finger ring 10. Shown therein, the inner and outer rings 12 and 11, respectively, are joined together, becoming the single vented or decorative finger ring 10. In practice, the inner and outer rings are preferably co-injection molded with a first elastomer, with the outer ring 11 being formed first, followed by an injection of a second elastomer that forms the inner ring 12, forming the vented or decorative finger ring 10.

The utilization of the co-injection molding process of the invention allows for the adoption of a multitude of design features in the vented or decorative finger ring 10, to include, forming design features on the outer surface of the outer ring 11, and forming a wide variety of slots or grooves in the inner surface of the inner ring 12, as set out below.

Figure 2:
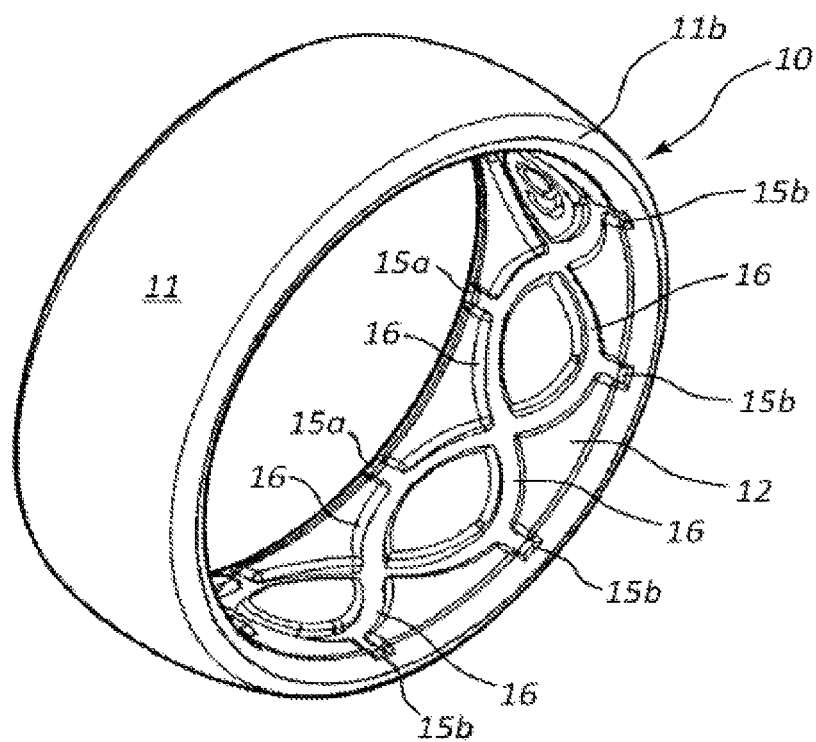
FIG. 2 is a side elevation perspective view like that of FIG. 1 taken from the right side of the vented or decorative finger ring.
Figure 3:
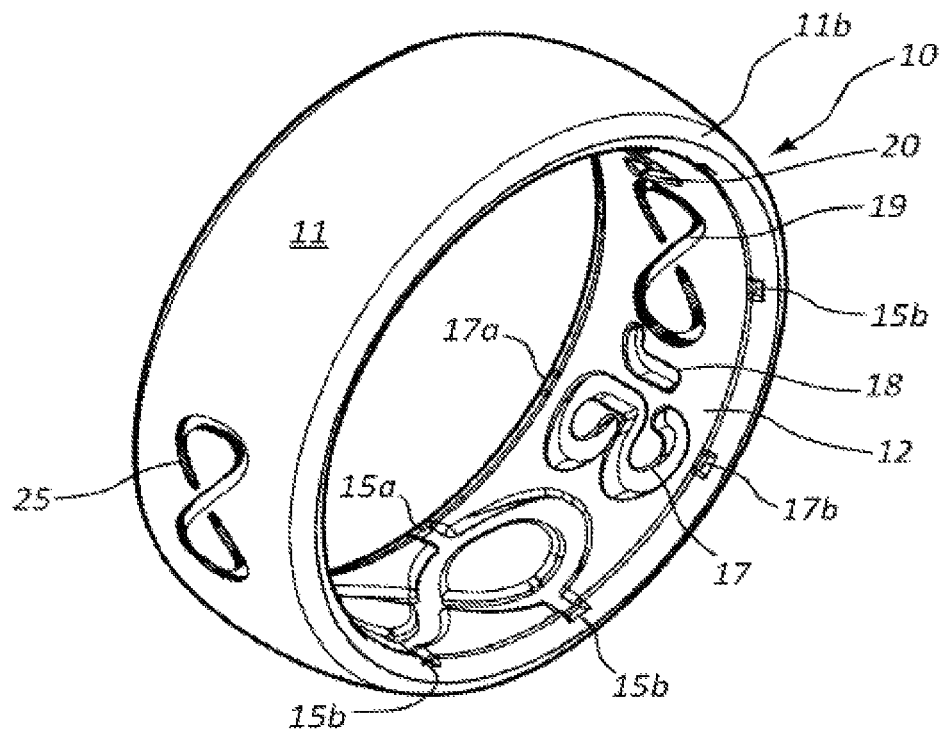
FIG. 3 is a also a side elevation view like that of FIG. 2 only showing the inner ring as having a different arrangement of decorative longitudinal groove from the pattern shown in FIGS. 1 and 2.

FIGS. 1 through 3 and FIG. 8, that is a rolled out version of the inner ring 12, show the decorative finger ring 10 as having spaced lateral slots or grooves 15a and 15b formed in spaced relationship, inwardly from the outer edges of the inner ring 12 left and right sides 12a and 12b, respectively, that extend inwardly from the inner ring sides 12a and 12b to connect to linked elliptical slots or grooves 16, with the lateral slots or grooves and linked elliptical slots or grooves providing passages across the inner ring to encourage a flow of air from one side of the inner ring 12, across the inner ring 12, to exit the other side of the inner ring 12, the air flow traveling from one inner ring 12 side to the other. Also, FIGS. 1 through 3, show a decorative symbol of a stylized letter G identified as 17, that connects, at opposite sides to lateral grooves 17a, respectively. Where the respective lateral slots or grooves 15a and 15b and 17a and 17b, respectively, are shown as aligned, it should be understood, that they can be off-set across from one another, within the scope of the invention. It should, however, be further understood that the combination of the lateral slots or grooves that connect to the longitudinal elements, as shown, provide air flow pathways that are unique to the invention.

Figure 8:
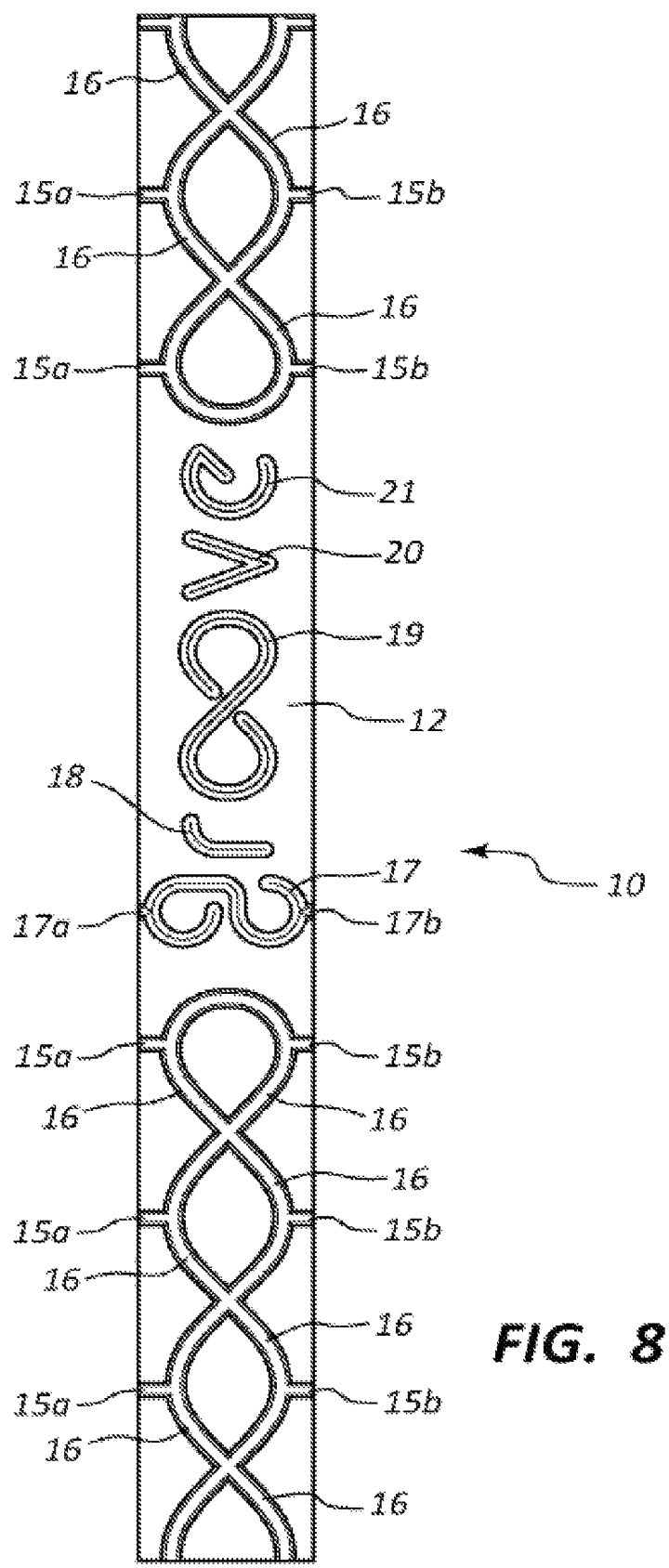
FIG. 8 shows a top plan view of the inner ring that has been flattened that is an example of an elaborate longitudinal slot or groove configuration that includes different symbols and designs, illustrating the decorative possibilities that the vented or decorative finger ring of the invention affords.

Additionally, as shown best is FIG. 8, the inner ring 12 can include decorative slots or grooves that do not connect to lateral slots or grooves. Examples of such are shown as a lower case letter "r", identified at 18, a pair of "O"'s formed as an infinity symbol 19, and a lower case letter "v", identified at 20 and a lower case letter "e", identified at 21. Which decorative grooves or slots 17 through 21 spell out the word "Groove".

FIG. 8 illustrates the versatility of the vented or decorative finger ring 10 for both providing a number of air passages across the inner ring 12 as well are providing decorative designs thereto. Also, while the lateral slots or grooves are show in FIGS. 1 through 3 and 8, it should be understood that they need not align, and can be off-set from one another, within the scope of this invention.

Figure 4:
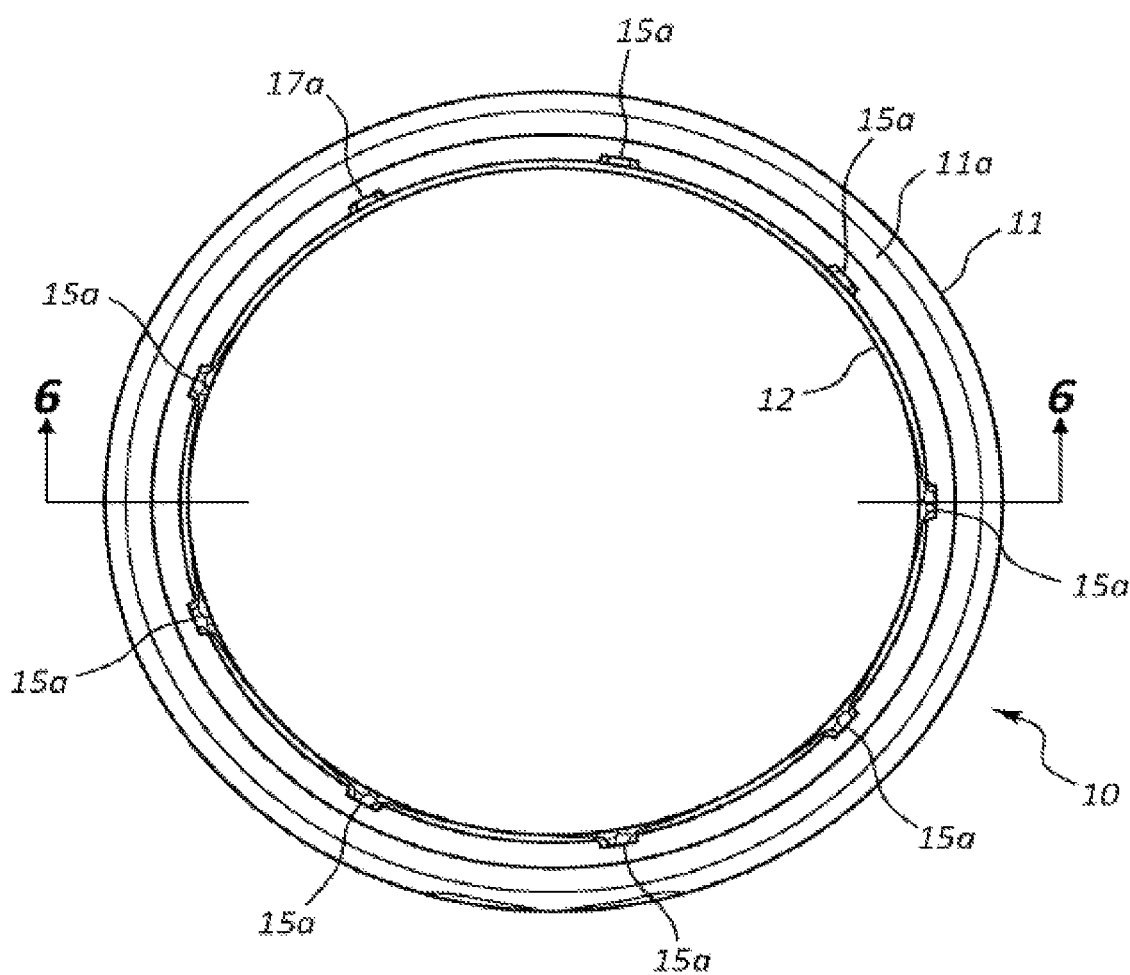
FIG. 4 is a side elevation view of the vented or decorative ring of FIG. 1 showing the spaced lateral grooves of the inner ring that has been formed, at spaced intervals, into the side of the inner ring.

FIG. 4 shows a side elevation view of the vented or decorative finger ring 10 taken from the side thereof and shows the junction of the outer and inner rings, 11 and 12, respectively, along with the space later slots or grooves 15a and 17a, respectively, and, additionally, as also shows in FIG. 5, the top edges 11a having been beveled to provide an inward slope thereto.

Figure 5:
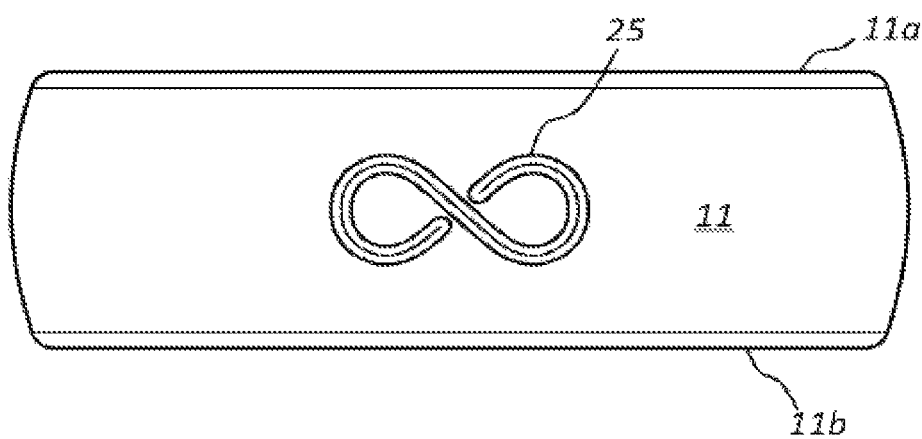
FIG. 5 is a section of an embodiment of the outer ring top surface that is shown as having had decorative slot or groove formed therein, illustrating a decorative symbol formed in the outer ring outer surface.

FIG. 5 shows a section of the top surface of the outer ring 11 that includes an infinity symbol 25 formed into the outer ring 11 top surface that illustrates an example of a decorative addition that can be made to the outer ring top surface for adding decorative appeal thereto.

Figure 6:
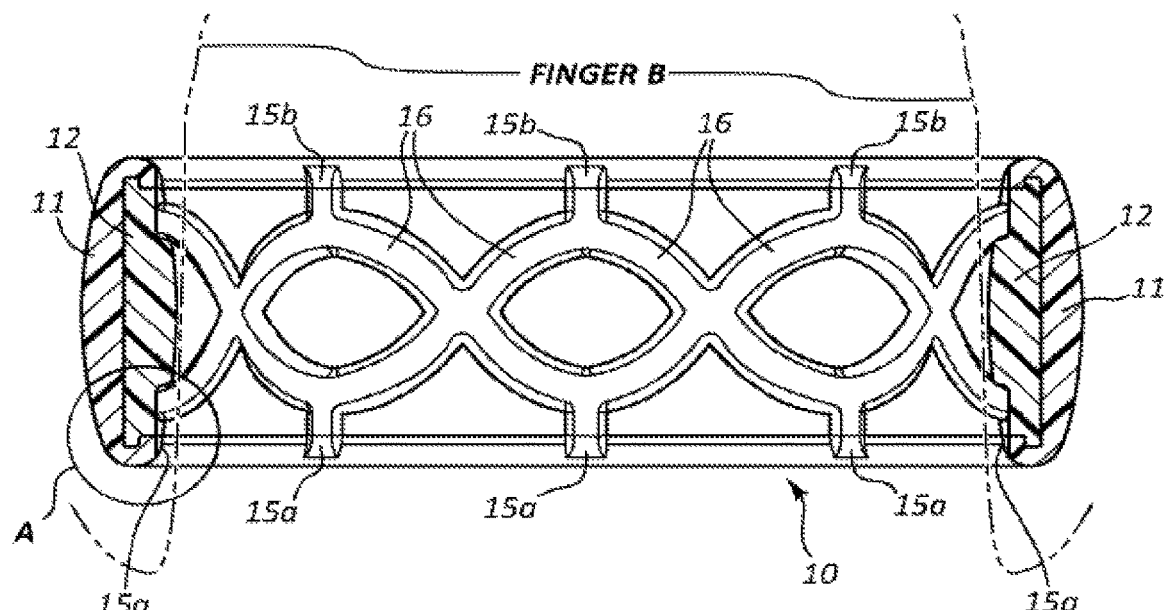
FIG. 6 is an enlarged sectional view taken along the line 6-6 of FIG. 4 showing the inner and outer rings as having been formed together into the vented or decorative finger ring, and showing, in broken lines, a persons's finger B wearing the decorative finger ring.

FIG. 6 is a sectional view taken along the line 6-6, of FIG. 4, that shows a cross section of the vented or decorative finger ring 10, and shows, as longitudinal slots or grooves, interconnected ellipses extending longitudinally between the ring sides that each include a lateral slot or groove 15a connected thereto, with the combination of the connected lateral slots or grooves and ellipses for providing a free flow of air across the decorative finger ring 10. Which FIG. 6 shows, in broken lines B, a section of a wearer's finger.

Figure 7:
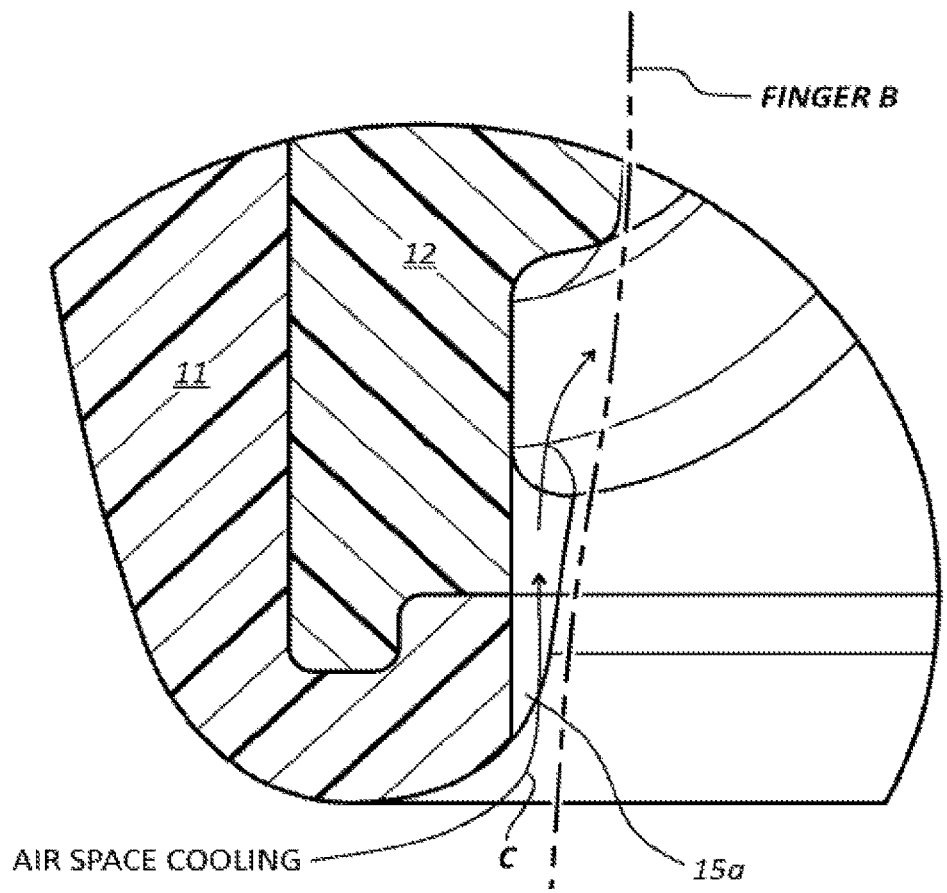
FIG. 7 shows an enlarged end sectional view taken within the circle A showing an air flow, as arrows C, traveling through and around a part of a lateral groove or slot on a first side of the inner ring, that travels through and around the longitudinal decorative groove or slot, to exit through a lateral groove or slot on the second side of the inner ring.

FIG. 7 shows an enlarged section of the vented or decorative finger ring 10 of FIG. 6 taken within the circle A showing, and shows the lateral and longitudinal slots or grooves 15a and 16 as providing AIR SPACE COOLING, identified with arrows C. So arranged, It should be understood, that an air flow as passes through the lateral slot or groove 15a travels through the ellipse 16 and out of the lateral passages 15b, providing thereby a breathing action to the wearer's finger B, that is shown in broken lines. Where decorative longitudinal slots or grooves are shown as preferred in the drawings, it should be understood that any arrangement of interconnected longitudinal slots or grooves that connect through spaced lateral slots or grooves that are open at the vented or decorative finger ring sides to provide a plurality of open passages from one side of the undersurface of the vented or decorative finger ring to the other are within scope of this invention.

Additional to the configuration of the vented or decorative finger ring 10 as having interconnected lateral and longitudinal slots or grooves, the invention is also in the method of manufacture of the vented or decorative finger ring 10. Specifically, the method of manufacture of the invention is in a co-injection molding procedure that includes the steps shown in FIG. 9.

Figure 9:
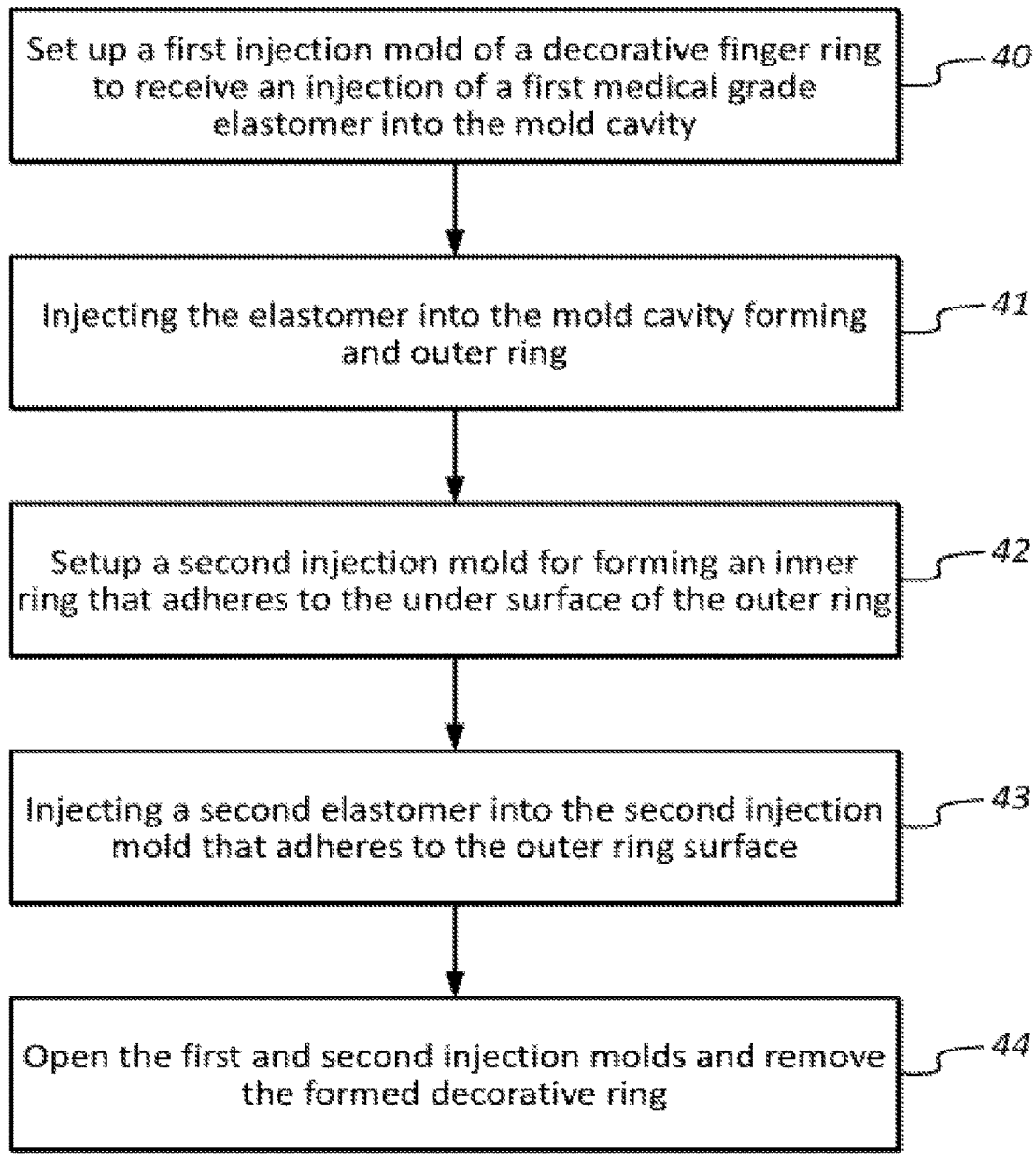
FIG. 9 shows a block flow schematic showing, as blocks, the steps taken in manufacture of the vented or decorative finger ring of the invention.

FIG. 9 is a block flow diagram showing the sets for forming the vented or decorative finger ring 10 of the invention utilizing a co-injection molding procedure. Block 40 sets out the step of setting up a first injection mold of the decorative finger ring to receive an injection of a first medical grade elastomer into the mold cavity. Block 41 sets out the step of injecting the elastomer into the mold cavity forming the outer ring 11 of the vented or decorative finger ring 10. Which first elastomer can be, clear, colored and/or opaque within the scope of the disclosure. Also, it should be understood, the mold for the outer ring that receives the injection molding material, may have a smooth surface to produce a smooth outer ring, or, within the scope of this disclosure, may have a decorative pattern formed therein to provide a decoration in the outer ring surface. A next block 4 sets out the setting up of a second injection mold for forming the inner ring where the injected elastomer is selected to adhere to the undersurface of the outer ring. Next, block 43 calls for injecting the second elastomer into the second injection mold that is spaced apart from the molded outer ring 11, where the second elastomer bonds to the outer ring undersurface, forming the vented or decorative finger ring 10. With block 44 setting out the opening of the first and second injection molds and removing the formed vented or decorative finger ring.

Unique to the method of the invention, the mold for forming the inner ring 12 includes inner connected raised lateral and longitudinal ridges formed therein that the second material flows around in the molding process, with the lateral ridges extending inwardly from opposite edges of the second mold, forming spaced lateral slots or grooves that intersect with a pattern of longitudinal slots or grooves formed around the inner circumference of the inner ring 12. Which longitudinal slots and grooves can be straight slots or grooves, can be a pattern of shapes, such as a number of linked ellipses with the lateral slots or grooves intersecting the individual shapes, forming a flow path for air to flow under vented or decorative finger ring inner surface from one side of the vented or decorative finger ring to the other. It should, however, be understood that a plurality of air flow paths under the vented or decorative finger ring under surface are needed to provide effective air circulation, but that all longitudinal features formed as slots or grooves in the inner ring need not be connected to a lateral slot or groove, with the plurality of so connected lateral and longitudinal slots or grooves being sufficient to provide effective air circulation. Further, it should be understood that the first and second elastomers may be the same or of different colors or clarity, to provide decorative appeal to the finished vented or decorative finger ring 10.

Herein above has been shown and described a preferred embodiment of the vented or decorative finger ring 10 of the invention and its process or manufacture. It should, however, be understood that the present disclosure is made by way of example only and that variations are possible without departing from the subject matter coming within the scope of the following claims and a reasonable equivalency thereof, which subject matter I regard as my invention.

I claim:

1. A vented finger ring, comprising:
    an outer ring formed with a smooth inner surface;
    an inner ring that is sized to fit within said smooth inner surface of said outer ring, and wherein said inner ring includes a plurality of lateral slots or grooves formed at spaced locations around a left outer edge and a right outer edge of said inner ring that extend inwardly to intersect linked slots or grooves formed at intervals between said left and right outer edges of said inner ring;
    wherein said outer ring and said inner ring each comprises an elastomer; and
    wherein said outer ring is bonded to said inner ring, forming said vented finger ring.

2. The vented finger ring as recited in claim 1, wherein a left outer edge and a right outer edge of a top surface of said outer ring are beveled; and said top surface of said outer ring includes a decorative design formed therein.

3. The vented finger ring as recited in claim 1, wherein each slot or groove of said plurality of lateral slots or grooves is perpendicular to said left outer edge and said right outer edge of said inner ring and each connects into said linked slots or grooves.

4. The vented finger ring as recited in claim 1, wherein said linked slots or grooves are a plurality of ellipses connected end to end and each said ellipse connects to an end of at least one said slot or groove of said plurality of lateral slots or grooves.

5. The vented finger ring as recited in claim 4, further including a decorative slot or groove formed in the inner ring that does not connect to said plurality of lateral slots or grooves.

6. The vented finger ring as recited in claim 1, wherein the outer and inner rings are formed from an elastomer or elastomers where the outer ring is first injection molded and the inner ring is then second injected molded and bonds to the smooth inner surface of the outer ring.

7. A method for manufacturing the vented finger ring of claim 1 in a co-injection molding process comprising the steps of:
    setting up an injection molding system with a first mold for forming said outer ring having said smooth inner surface;
    injecting a first elastomer into said first mold to form said outer ring;
    setting up said injection molding system with a second mold for forming said inner ring having said plurality of lateral slots or grooves and said linked slots or grooves formed therearound; and
    injecting a second elastomer into said second mold to bond with said smooth inner surface of said outer ring forming said vented finger ring.

8. The method for manufacturing the vented finger ring as recited in claim 7, wherein the first mold outer surface has a raised design formed therein that will form a decorative slot or groove in an outer surface of the outer ring.

9. The method for manufacturing the vented finger ring as recited in claim 7, wherein a right edge and a left edge of the first mold are tapered so as to form beveled edges on an outer surface of the outer ring.

10. The method for manufacturing the vented finger ring as recited in claim 7, wherein the second mold includes a plurality of ridges formed on a surface opposing an inner surface of the first mold, where said plurality of ridges include spaced lateral ridges that extend inwardly from a right outer edge and a left outer edge of said second mold to connect, at spaced intervals, to a plurality of linked ridges formed around said opposing surface of said second mold, such that, with the injection of the second elastomer into said second mold, a plurality of interconnected lateral and linked slots or grooves are formed in said inner ring.

11. The method for manufacturing the vented finger ring as recited in claim 7, wherein at least one of the first elastomer and the second elastomer is colored, opaque, or clear.

12. The method for manufacturing the vented finger ring as recited in claim 11, wherein the inner ring further comprises at least one decorative slot or groove that does not connect to said plurality of lateral slots or grooves.

* * * * *